United States Patent Office 2,957,935
Patented Oct. 25, 1960

2,957,935
MERCURIC SALTS AND METHODS OF PREPARING SAME

Bernard S. Wildi, Dayton, Ohio, and Joseph Stanley Dunn, Rochester, N.Y., assignors to Monsanto Chemical Company, St. Louis, Mo., a corporation of Delaware No Drawing. Filed Apr. 13, 1956, Ser. No. 577,935

6 Claims. (Cl. 260—434)

This invention is directed to mercuric peroxy acid salts and to methods of preparing these salts.

The carboxylic peracid mercuric salts of the present invention can be represented by the structural formula

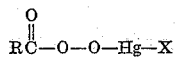

in which R is an organic radical and X is a salt-forming acid radical.

The mercuric carboxylic peracid salts of the present invention have many valuable uses, e.g., as oxidizing, epoxidizing and dehydrogenating agents.

The novel mercuric peroxy acid salts of the present invention are prepared by reacting mercuric cations with peroxy acid anions, usually by providing a solution with mercuric cations and peroxy acid anions.

Among the per acids from which our novel mercuric salts can be formed are aliphatic peracids, such as performic acid, peracetic acid, perpropionic acid, perbutyric acid, perisobutyric acid, pervaleric acid, percaproic acid, percaprylic acid, percapric acid, perlauric acid, permyristic acid, perpalmitic acid, perstearic acid and unsaturated aliphatic peracids such as peracrylic acid, percrotonic acid, etc.; aromatic peracids including perbenzoic acid, monoperphthalic acid, perthalic acid, per-α-naphthoic acid, per-β-naphthoic acid, perterephthalic acid, perisophthalic acid, persalicyclic acid, pergentisic acid, perhomogentisic acid, pertoluic acid, etc.; heterocyclic peracids, e.g., perfuroic acid; and polybasic peracids, e.g., the aforementioned phthalic acids, persuccinic acid, permonosuccinic acid, permaleic acid, peradipic acid, perfumaric acid, etc.; and cyclic peracids, e.g., percyclohexanoic acid. The present invention contemplates the mercuric peracid salts of any carboxylic acid, regardless of the molecular weight of the acid. However, it is preferred to use percarboxylic acids having at least six carbon atoms, as the mercuric salts of the lower peracids are less stable than the mercuric salts of higher molecular weight acids. Moreover, it is not ordinarily desirable to use acids having more than 20 carbon atoms.

The mercuric salts of our invention can have either one or two mercuric peroxy linkages, as represented by:

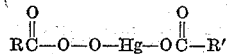

and

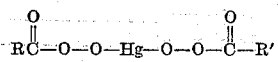

in which R and R' are organic radicals. Of the two types of salts, the salts represented by the latter formula in which the Hg is linked to two peroxy groups are preferred. Each of R and R' above can be a saturated or unsaturated aliphatic radical of say 1 to 19 or more carbon atoms, e.g., hexyl, acetyl, dodecyl, etc., or an aromatic radical, e.g., phenyl, 1-naphthyl, 2-naphthyl, 2-carboxyphenyl, tolyl, etc., or an aralkyl radical, e.g., benzyl, or a heterocyclic radical, e.g., 2-furyl, and R and R' taken together can be a divalent aliphatic radical of about 2 to 18 or more carbon atoms, or a phenylene group, or the non-carboxyl portion of any dibasic salt-forming carboxylic peracid. It is preferred that R and R' be hydrocarbon radicals.

Our novel mercuric salts of carboxylic peracids are solids which are stable at temperatures ranging up to about 100–110° C. or the like, and which decompose explosively above their decomposition temperatures.

The mercuric salts of carboxylic peracids are prepared by a salt-forming reaction between mercuric cations and carboxylic peracid anions. For example, when an aqueous solution of mercuric chloride and an aqueous solution of sodium perbenzoate are mixed at room temperature, the water-insoluble mercuric perbenzoate,

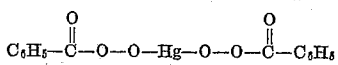

is precipitated as a white solid. The reaction is conveniently conducted at room temperature, although higher temperatures, e.g., up to about 100°, or lower temperatures, e.g., down to 0° C., can be used; still lower temperatures can be used if alcohol is added to the aqueous solution. Ordinarily, however, temperatures in the range of 0 to 60° C. are used. As the peracid salt product is an oxidizing agent, it is desirable to conduct the reaction in the absence of reducing agents and under oxidizing or inert conditions, i.e., under non-reducing conditions. The mercuric ion is conveniently added as a salt, preferably as a non-reducing salt having an appreciable degree of water solubility, e.g., mercuric acetate, mercuric chloride, mercuric chlorate, mercuric bromide, and mercuric salts of other lower carboxylic acids. The concentrations of these mercuric salts can be varied considerably, but should not exceed their solubility limits. If desired, the solubility of the mercuric salt reactant can be increased by warming the solution. The carboxylic peracid is conveniently placed in solution by dissolving it in an alkaline solution, e.g., sodium hydroxide solution, to form an aqueous solution of the alkaline salt. Or, the alkaline salt of the carboxylic peracid can simply be dissolved in water. Of course, salt-forming alkali and alkaline earth metals other than sodium can be used, e.g., potassium, calcium, etc. Moreover, the carboxylic peracid itself can be dissolved in water and reacted, its solubility being increased by the addition of alcohol if necessary. It is also possible to add the acids in the form of their anhydrides.

The following examples illustrate certain specific embodiments of the present invention.

*Example 1*

In a 100 ml. solution of water containing 0.27 gram of sodium hydroxide, 2 grams of perbenzoic acid (93.5% assay) was dissolved. This solution was poured with vigorous stirring into a solution of 1.83 grams of mercuric chloride in 100 ml. of water. The white precipitate which formed was filtered from the solution and washed with 200 ml. of cold water. The precipitate was dried overnight at 40° C. to give 0.855 gram of dry product. The mercuric perbenzoate melted at 110° with explosive decomposition and also burned with explosive violence.

*Example 2*

Perbenzoic acid, 2.23 grams, was dissolved in 100 ml. of water and mixed at 0° C. with a solution of 0.646 gram of sodium hydroxide dissolved in 15 ml. of water. Then a solution of 2.2 grams of mercuric chloride in 75 ml. of water was added. The aqueous reaction mixture was stirred at 0° C. for 1 hour and filtered. The filtered solids were dried at 40° C. for 18 hours to give 2.475 grams of mercuric perbenzoate, which melted with decomposition at 110° C.

The following example illustrates the usefulness of mercuric perbenzoate as an epoxidization agent.

*Example 3*

Mercuric perbenzoate, 2 grams, was dissolved in 25 ml. of acetic acid. This solution was added to one consisting of 0.75 gram of 5-dihydroergosteryl acetate (M.P. 179–183° C.) dissolved in 5 ml. of chloroform. The mixture was stirred at room temperature for 72 hours, and then evaporated to dryness under vacuum. The white residue was triturated with two 100 ml. portions of chloroform. The chloroform was evaporated to dryness under vacuum leaving a crystalline residue which was very soluble in acetone.

The solids which had been triturated with chloroform were dissolved in acetone and concentrated to about 3–5 ml., causing large crystals to separate, 0.3368 gram in amount. After two recrystallizations from acetone, 0.0457 gram of product, M.P. 203–205°, was obtained. Infrared analysis showed an epoxide band at 8 $\mu$ and no phenyl absorption. The spectrum was similar to that of $\Delta^{7,22}$-3$\beta$ - acetoxy - 9(11)$\alpha$ - oxido - ergostadiene, indicating that the product was an epoxide derivative of dihydroergosteryl acetate.

Formerly, in preparing an epoxide from 5-dihydroergosterol, it was necessary to use a two-step procedure, such as is represented by the following equations:

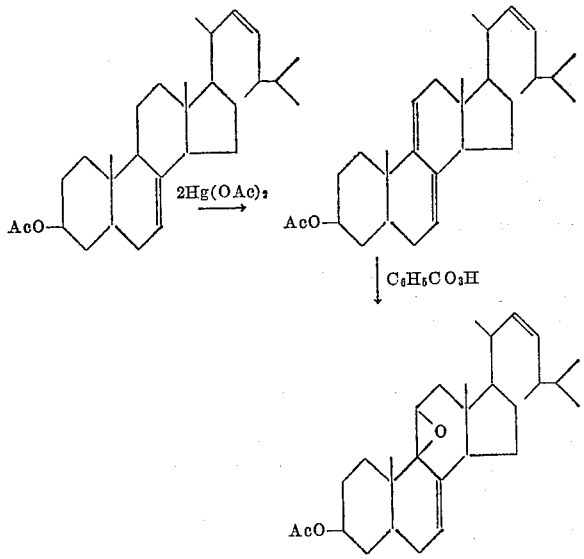

in which the form and numbering of the structural formulae is according to conventional steroid usage. The mercuric peracid salts of the present invention make it possible to prepare an epoxide derivative of 5-dihydroergosterol in one step.

Our novel process of preparing mercuric peracid salts of carboxylic acids can be applied generally to aqueous solutions of organic peracid salts and non-reducing mercuric salts.

Ordinarily it is preferred to react the organic peracid or its salt and the mercuric salt in the stoichiometrically required proportions to obtain the mercuric di-peracid salt, e.g., two moles of monobasic organic peracid for one mole of mercuric salt. However, greater or lesser amounts of either reactant can be used. A large excess of a mercuric salt such as mercuric acetate will promote the production of mixed salts such as mercuric acetate perbenzoate. A stoichiometric excess of the carboxylic peracid can be used, but it will naturally result in incomplete conversion of the peracid to its mercuric salt. It is usually desirable to use from 0.5 to 1.5 stoichiometric equivalents of organic peracid per equivalent of mercuric salt. When the organic peracid is reacted in aqueous alkaline solution, at least one stoichiometric equivalent of alkaline material should ordinarily be used, and higher amounts can also be used, e.g., up to 3 equivalents or more.

Of course, mixtures of mercuric salts or mixed mercuric salts can be used in the salt-forming reaction, e.g., a mixture of mercuric acetate and mercuric chloride, or mercuric acetate chloride. Similarly, mixtures of organic peracids or their salts can be used to give mixtures of mercuric peracid salts or mixed mercuric peracid salts as products.

Mercuric salts of organic peracids have been described. Methods of reacting mercuric cations with organic peracid anions to prepare mercuric salts of organic peracids have been described.

We claim:

1. As new compounds, the mercuric salts represented by the formula:

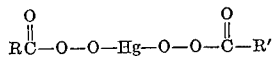

in which R and R' represent monocyclic aryl radicals.

2. As new compounds, the mercuric salts represented by the formula:

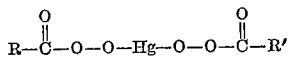

in which R and R' represent hydrocarbon radicals of up to 19 carbon atoms selected from the group consisting of monocyclic aryl and saturated aliphatic hydrocarbon radicals.

3. As a new compound, mercuric perbenzoate.

4. A method of preparing mercuric salts of organic peracids which comprises mixing under non-reducing conditions an aqueous ionizable mercuric salt solution to provide mercuric cations with an aqueous solution of ionizable hydrocarbon carboxylic peracid salt solution to provide carboxylic peracid anions, said peracid salt being selected from the group consisting of the alkali and alkaline earth metal salts of hydrocarbon carboxylic peracids in which the hydrocarbon groups contain up to 19 carbon atoms and are selected from the group consisting of monocyclic aryl and saturated aliphatic hydrocarbon radicals, to produce the said mercuric salts.

5. The method of claim 4 in which the reaction is conducted at 0° to 60° C. and there are 0.5 to 1.5 stoichiometric equivalents of said carboxylic peracid salt per equivalent of said mercuric salt reactant.

6. A method of preparing mercuric perbenzoate which comprises mixing under non-reducing conditions about 1 mole of mercuric chloride ionized in aqueous solution with about 2 moles of sodium perbenzoate ionized in aqueous solution at a temperature of 0 to 60° C. to form the mercuric perbenzoate as a precipitate.

References Cited in the file of this patent

UNITED STATES PATENTS

| | | |
|---|---|---|
| 2,112,129 | Anderson | Mar. 22, 1938 |
| 2,377,038 | Reichert et al. | May 29, 1945 |

OTHER REFERENCES

Chem. Reviews, vol. 45, August 1949, p. 13.